Oct. 19, 1965   O. K. LUNDELL   3,213,238
STEPPING SWITCH
Filed June 7, 1963   3 Sheets-Sheet 1
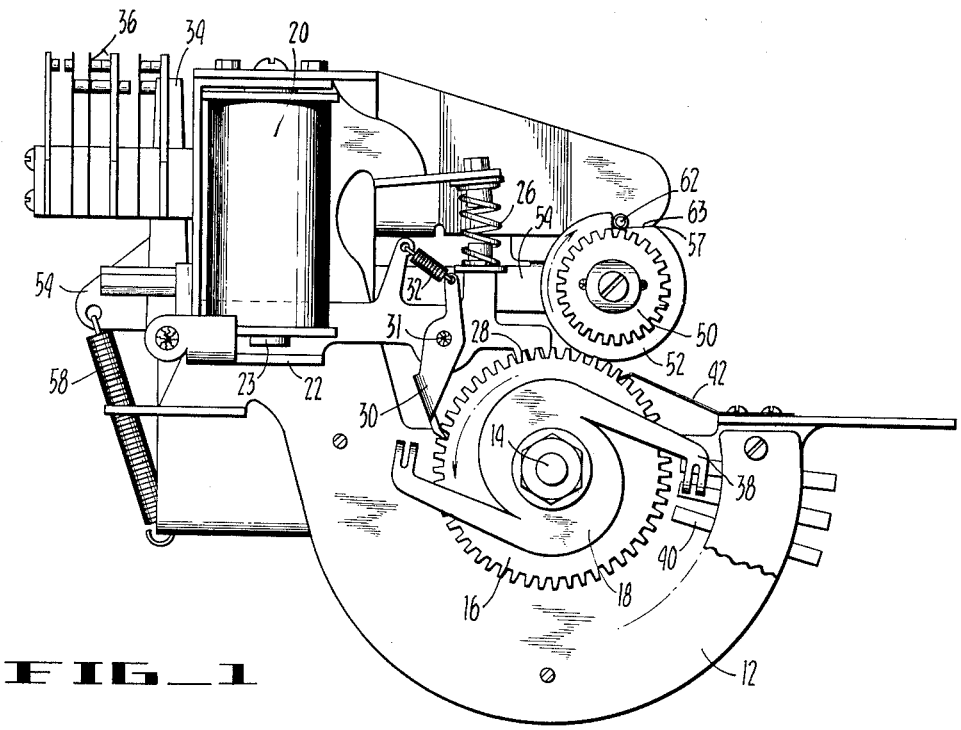
FIG_1
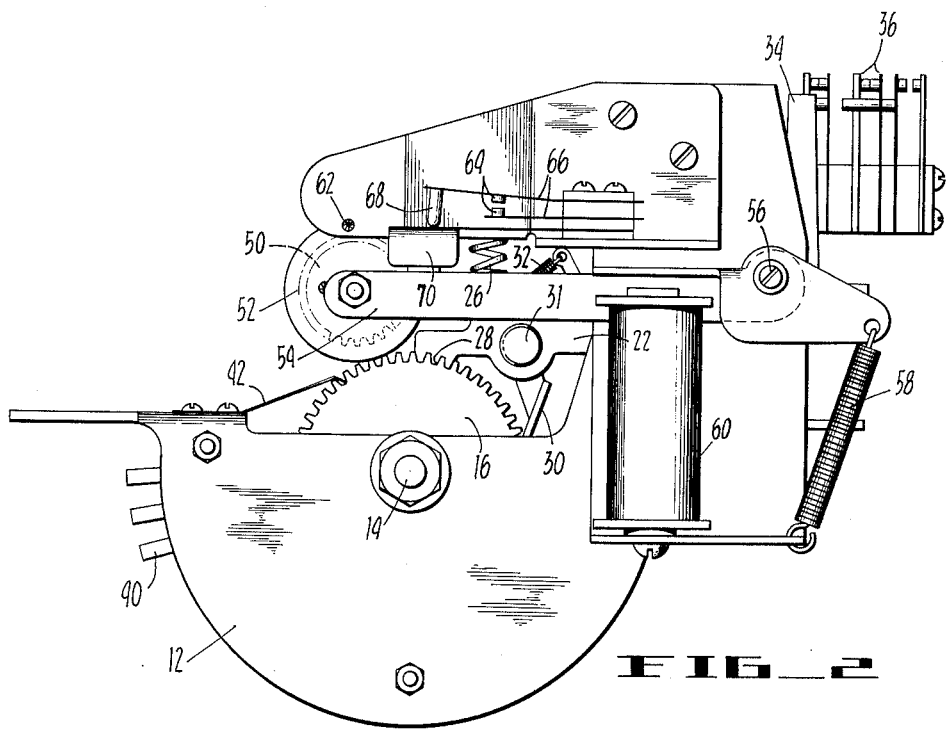
FIG_2

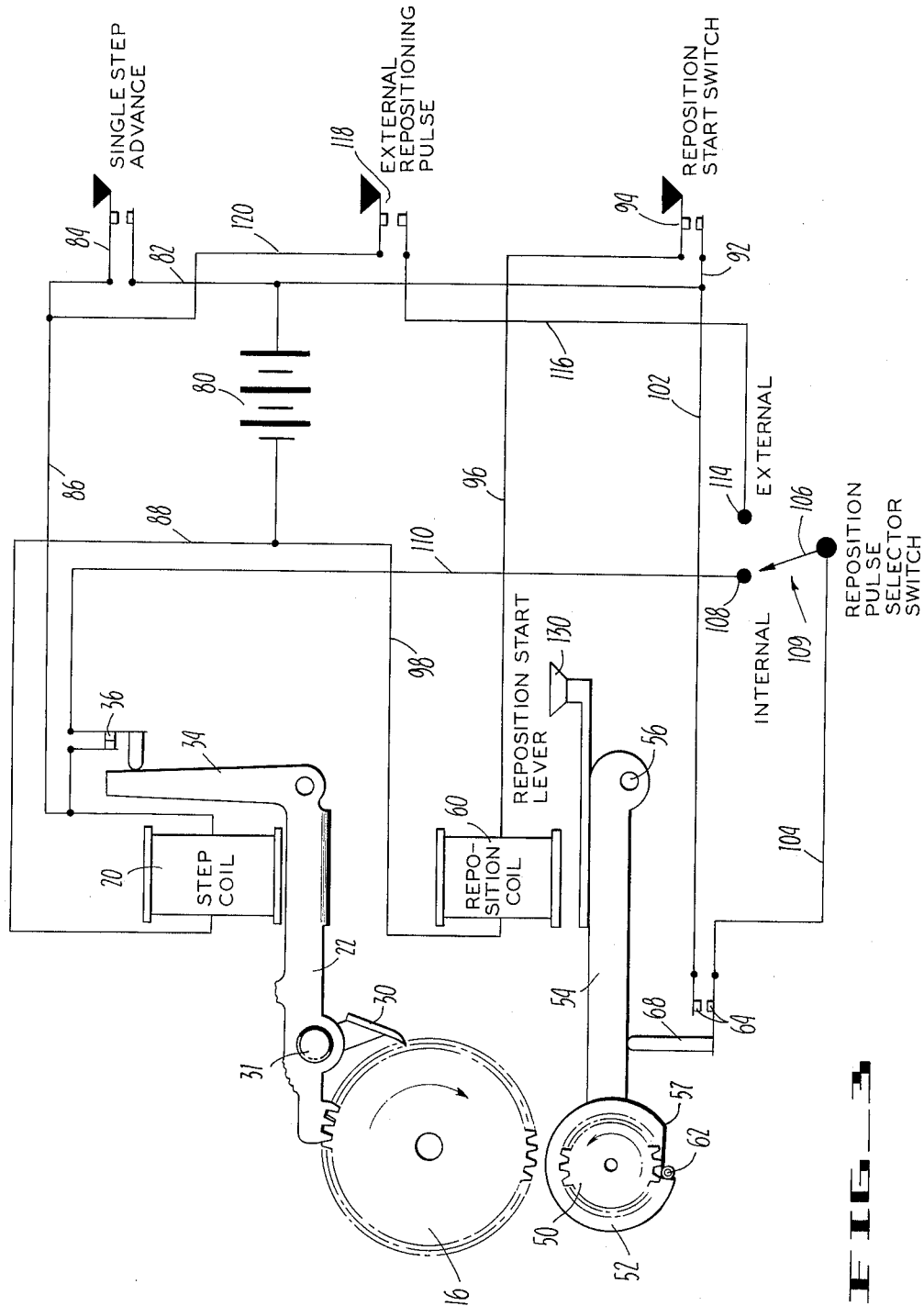

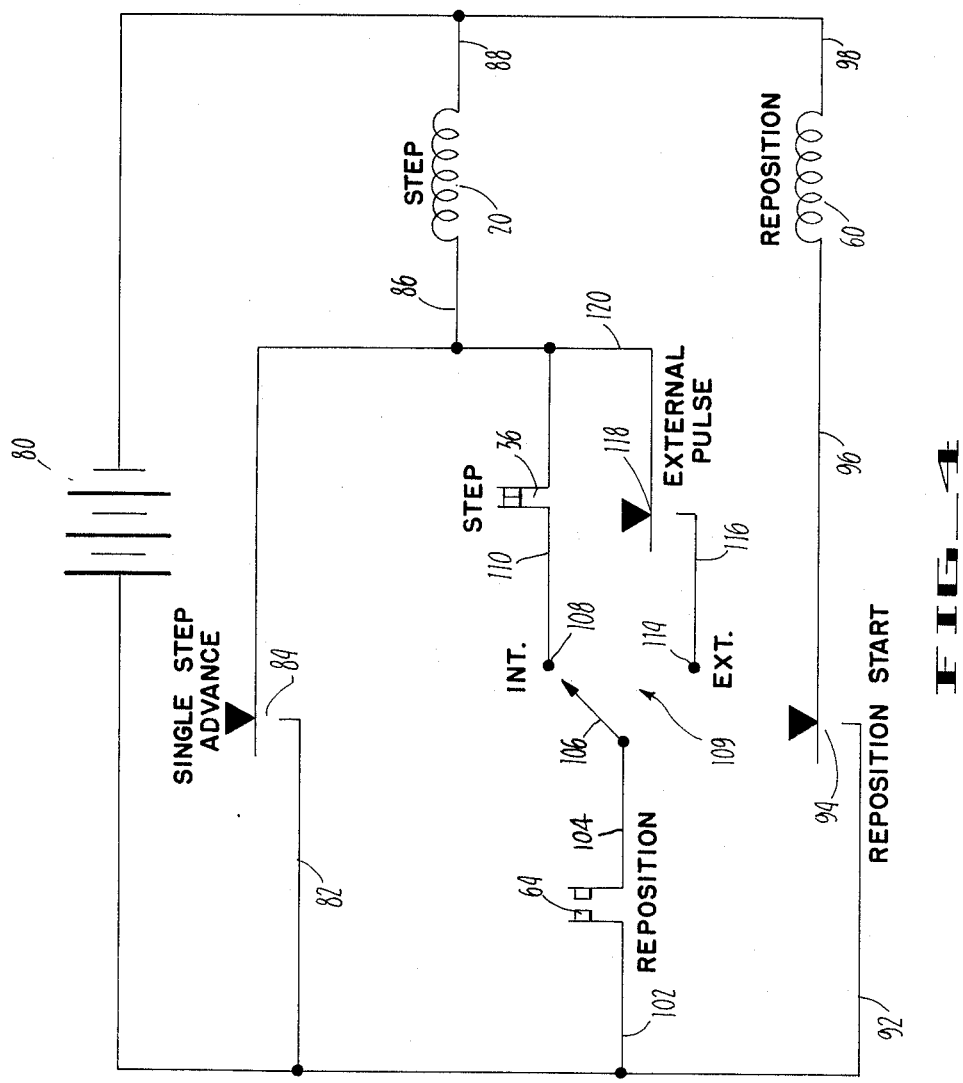

United States Patent Office 3,213,238
Patented Oct. 19, 1965

3,213,238
STEPPING SWITCH
Oral K. Lundell, San Leandro, Calif., assignor, by mesne assignments, to Friden, Inc., San Leandro, Calif., a corporation of Delaware
Filed June 7, 1963, Ser. No. 286,245
6 Claims. (Cl. 200—105)

The present invention relates to electric stepping switches.

It is an object of the present invention to provide means in a stepping switch for controlling the driving means of the switch for advancing the switch a predetermined number of steps.

A further object is the provision in a stepping switch of means engageable with the stepping part thereof for controlling its operation during a predetermined number of steps.

A further object is the provision of an improved electric stepping switch.

These and other objects and advantages of the invention will be apparent from the following description of one specific embodiment thereof taken in connection with the accompanying drawings, in which:

FIG. 1 is a front elevation of an electric stepping switch embodying my invention;

FIG. 2 is a rear elevation thereof; and

FIGS. 3 and 4 are electric circuit diagrams therefor.

In FIGS. 1 and 2, a stepping switch includes a frame 12 carrying a shaft 14 on which is rotatably mounted an assembly comprising a stepping gear 16 and a wiper 18, the wiper 18 being electrically insulated from the gear 16, the shaft 14 and the frame 12. A driving motor for the gear 16 and wiper 18 includes an electromagnet 20 having a clapper armature 22. This armature is normally urged down in FIGS. 1 and 2, and away from a core 23 of the magnet 20, by a spring 26. Aligning teeth 28 on armature 22 are thereby forced into mesh with the teeth of gear 16 for holding that gear from rotating and for holding it in an accurately aligned rotated position. This engagement of aligning teeth 28 with gear 16 determines the home, or normal, position of armature 22. A driving pawl 30 journalled at 31 on the armature 22 is urged into engagement with the gear 16 by a spring 32.

When the magnet 20 is energized, it attracts the armature 22. This action compresses the spring 26, lifts the aligning teeth 28 clear of the gear 16 and causes the pawl 30, in moving upward, to click over one tooth of the gear 16. When the magnet 20 is then de-energized for releasing the armature 22, the spring 26 returns the armature 22 to its normal position, and thereby causes the pawl 30 to drive downward against the tooth of the gear 16, for turning, or stepping, the gear 16 one tooth space, counter-clockwise in FIG. 1. At the end of this downward motion, the aligning teeth 28 re-engage the gear 16 for aligning and locking it in its new position.

The armature 22 includes an arm 34 which operates a plurality of electric contacts including a normally closed pair of contacts 36 which may be connected in series with the coil 20, as shown in FIG. 3, to provide automatic, rapid stepping of the switch. When the coil 20 is energized through these normally closed contacts, the armature 22 is attracted by the magnet 20, the arm 34 opens the contacts 36, the de-energized magnet 20 releases the armature 22, and the armature 22, in returning to its normal position, recloses the contacts 36 to permit the operation to repeat.

The wiper 18 includes two contact arms 38 which are arranged to move as the switch is stepped, from one to the next of a plurality of stationary contacts 40 arranged in a half-circle. The contacts 40 have the same angular spacing as the teeth of the gear 16. Thus, the gear 16 is provided with fifty-two equally spaced teeth and there are twenty-six of the contacts 40 equally spaced in a half-circle, so that one of the two contact arms 38 engages one of the contacts 40 in each of the stepped and aligned angular positions of the gear 16. As one of the arms 38 is stepped off the last contact 40 in the series, the other arm 38 steps on to the first contact of the series.

A leaf spring 42 serves as a stop pawl to prevent retrograde rotation (clockwise in FIG. 1) of the gear 16 and wiper 18.

The mechanism thus far described is old and well known.

In accordance with the present invention I include a gear 50 engageable with the gear 16. This gear 50 has a cam 52 affixed thereto, and the cam and gear are journalled free on a lever, or clapper armature, 54 which is journalled at 56 on the frame 12. A spring 58 urges the armature 54, counter-clockwise in FIG. 1, and an electromagnet 60 is arranged to move it in the opposite direction against the force of the spring 58. A pin 62 on the frame 12 of the stepping switch limits the spring-urged motion, counter-clockwise in FIG. 1, of the armature 54. In the home, or normal, rotated position of the gear 50 and cam 52, shown in FIG. 1, a notch 63 of the cam embraces the pin 62 and permits the gear 50 to be lifted by the spring 58 clear of the gear 16. When the gear 50 and cam 52 are rotated out of their home position, the periphery of cam 52 can engage the pin 62 for holding the gear 50 in mesh with the gear 16. When the cam 52 thus locks the gear 50 in mesh with the gear 16, the two gears must rotate together until the notch 63 of the cam 52 again comes under the pin 62 and permits the armature 54 to be raised, rotated counter-clockwise in FIG. 1, by the spring 58.

Electric contacts 64, actuated by the armature 54, are provided for controlling the energization and the operation of the stepping switch motor magnet 20. These contacts provide energization to the motor 20 as long as the armature 54 is in its lower position, in which position the gear 50 is in mesh with gear 16. Thus, this energization of the motor 20, when once effected, continues under control of the cam 52 for the number of steps required for returning the gear 50 and cam 52 to their home position. In the specific construction shown in FIG. 1, gear 50 is provided with twenty-six teeth and so, for a rotation of 360° by gear 16, would require twenty-six steps of gear 16. However, the notch 63 is of such width that its leading lip 57 passes pin 62 as gear 16 makes its twenty-fifth step. Consequently, because spring 58 is urging the gear 50 and cam 52 up, the cam-like leading edge of notch 63 acts against pin 62 to rotate cam 52, clockwise in FIG. 1, and thereby let the gear 50 rise and disengage gear 16. Cam 52 is thereby turned to its home position. Accordingly, the energization of the stepping switch motor 20, under control of the gear 50 and cam 52, causes the contact arms 38 to scan twenty-five contacts, which is one fewer than the total. This arrangement provides, in effect, a backspacing of the stepping switch, which actually is capable of rotating in only one direction. Obviously, gear 50 can be constructed with either more or fewer teeth, and the length of notch 63 can be increased or decreased for causing gear 50 to be held in mesh with gear 16 for a different number of steps.

As shown in FIG. 2, two electric contacts 64 are carried on conducting leaf springs 66 which are biased to move the contacts 64 into engagement. The upper contact leaf spring 66 carries an insulating spacer 68 which rides on an ear 70 of the armature 54. In the normal position of armature 54, shown in FIGS. 1 and 2, the armature 54 holds the two contacts 64 disengaged. When the armature 54 is lowered, rotated counterclockwise in FIG. 2, for engaging the gears 50 and 16, contacts 64 engage for closing a controlling circuit and they remain engaged as long as the armature 54 is prevented from returning to normal by the action of the periphery of the cam 52 against the pin 62 (FIG. 1).

The two electric circuit diagrams, FIGS. 3 and 4, depict the same circuit, but FIG. 4 provides a simpler diagram of the circuits, although it does not indicate mechanical relationships. An electric power source for the circuits is indicated as the battery 80. A circuit extends from the battery 80 through a lead 82, the contacts of a normally open manually operable "single step" switch 84, a lead 86, the motor magnet 20 of the stepping switch, and a lead 88 back to the battery. The switch 84 may be closed manually for energizing the magnet 20 and lifting the armature 22 (FIG. 1). Then, switch 84 may be released to open the circuit and de-energize the magnet 20, whereupon the spring 26 will restore the armature 22 to its normal position and, in so doing, drive the stepping gear 16 and wiper 18 one step, counter-clockwise in FIG. 1.

A circuit is provided from the battery through a lead 92 to the normally open contacts of a manual "reposition-start" switch 94, a lead 96, the magnet 60 and a lead 98 back to the battery 80. Another circuit is provided from the battery 80 through a lead 102, the contacts 64 which are controlled by the armature 54, a lead 104, a movable contact 106, and a stationary contact 108, both part of a two-position switch 109, a lead 110, the normally closed contacts 36 actuated by the arm 34 of armature 22, the magnet 20 of the stepping motor, and the lead 88 to the battery 80.

The switch 94 may be manually closed for energizing the magnet 60 which will thereupon attract the armature 54 and move the gear 50 into mesh with the gear 16. The movement of armature 54 also closes the contact 64 for energizing the magnet 20 of the stepping motor for raising the armature 22 (rotating it counter-clockwise in FIG. 1). This motion of armature 22 disengages the aligning teeth 28 from the gear 16 and also clicks the pawl 30 up over one of the teeth of the gear 16. This upward motion of armature 22 also opens the contacts 36 for deenergizing the magnet 20 and releasing armature 22 to the action of the spring 26 which drives the armature 22 back to its normal position. The downward movement of armature 22 causes the pawl 30 to rotate the gear 16 one tooth space, and with it, the gear 50 which is in mesh with gear 16. This one-tooth rotation of gear 50 rotates the cam 52, clockwise in FIG. 1, enough to bring its outer periphery under the pin 62 in FIG. 1. Consequently, this initial step of the stepping gear 16, in response to the closing of the manual switch 94, has caused the cam 52 to lock the armature 54 in this lower position and the gear 50 in engagement with the gear 16. With the armature 54 thus held mechanically in its lower position by the cam 52, the contacts 64 remain closed even though the magnet 60 becomes de-energized by the release of the manual switch 94. With the contact 64 thus held closed, the magnet 20 is repeatedly energized and de-energized under the control of the contacts 36, in the well known manner, for driving the gear 16 and wiper 18 step-by-step, counter-clockwise in FIG. 1. The gear 50, being held in mesh with gear 16, is rotated by it and, in turn, rotates the cam 52. As previously described, the twenty-five stepping actions of the gear 16 bring the notch 63 under the pin 62 (FIG. 1) for thereby permitting the spring 58 to restore the armature 54 to its home position, shown in FIG. 1, and for thereby opening the contacts 64 (FIG. 2) and terminating the action.

Alternatively, the automatic advance of the stepping switch may be initiated by a mechanical actuation of the armature, or lever, 54. Thus a handle 130 (FIG. 4) on the armature 54 may be manually moved to swing gear 50 into engagement with gear 16 and to close contacts 64 and thereby initiate the automatic action.

In addition, the pulsing of the magnet 20 during automatic advance need not be controlled by contacts 36. To this end, a connection is provided from the second stationary contact 114 of the two-position switch 109, through a lead 116, a pulsing switch 118, here shown as a normally-open manually-operable switch, a lead 120, and the lead 86 to the magnet 20. As may be seen best in FIG. 4, this alternative connection substitutes the switch 118 for the switch 36 in generation of the stepping pulses and the control of the stepping rate.

It will be apparent to those skilled in the art that the present invention is capable of numerous modifications and variations and is to be limited only within the scope of the appended claims.

I claim:

1. In combination in a stepping switch, a rotatable stepping member, drive means for rotatably driving said stepping member step-by-step, a second rotatable member, shift means supporting said second member for movement of said second member into driven engagement with said stepping member and for biasing it away from said engagement, and cam means moved by said second rotatable member and operable for blocking said second rotatable member in said driven engagement with said stepping member, said cam means being movable by said second rotatable member into a position for releasing said second rotatable member from engagement with said stepping member.

2. In combination in a stepping switch, a rotatable stepping member, electric drive means for rotatably driving said member step-by-step, a second rotatable member, shift means supporting said second member for movement of said second member into driven engagement with said stepping member and for biasing it away from said engagement, electric contacts controlling said electric drive means and actuated in response to movement of said second rotatable member into and out of said driven engagement, and cam means moved by said second rotatable member and operable for blocking said second rotatable member in said driven engagement with said stepping member and said contacts in electric-drive-energizing position, said cam means being movable by said second rotatable member into a position for releasing said second rotatable member from engagement with said stepping member.

3. In combination in a stepping switch, rotatable stepping means including a stepping gear, electric drive means for rotating said stepping gear step-by-step, a movable arm, a second gear thereon, said arm being movable for carrying said second gear into driven engagement with said stepping gear and biased to disengage it therefrom, a cam on said arm rotated by said second gear, means engaged by said cam for blocking said arm in gear-engaging position, said cam having at least one rotated position in which it unblocks said arm, and electric contacts operated by said arm for controlling the operation of said electric drive means.

4. The combination of claim 3 wherein said cam is operable to block said arm in gear-engaging position for a predetermined number of steps of said stepping gear.

5. The combination of claim 3 wherein said drive means drives said rotatable stepping means in only one direction of rotation through a repeatable series of steps, and wherein said cam blocks said arm for a number of successive steps, said number being smaller than the number of steps in said repeatable series.

6. The combination of claim 5 wherein said cam blocks said arm for a number of steps one fewer than the number of steps in said repeatable series.

References Cited by the Examiner

UNITED STATES PATENTS 2,200,989   5/40   Lennox et al. _____ 200—92
2,816,975   12/57  Snyder _____ 200—92

BERNARD A. GILHEANY, *Primary Examiner.*

ROBERT K. SCHAEFER, *Examiner.*